(12) United States Patent
Lu

(10) Patent No.: US 12,045,709 B2
(45) Date of Patent: Jul. 23, 2024

(54) VEHICULAR DRIVING ASSIST SYSTEM WITH ENHANCED DATA PROCESSING

(71) Applicant: MAGNA ELECTRONICS INC., Auburn Hills, MI (US)

(72) Inventor: John Lu, Grand Blanc, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 351 days.

(21) Appl. No.: 17/655,387

(22) Filed: Mar. 18, 2022

(65) Prior Publication Data
US 2022/0207325 A1   Jun. 30, 2022

Related U.S. Application Data

(63) Continuation of application No. 15/929,569, filed on May 11, 2020, now Pat. No. 11,288,569, which is a continuation of application No. 15/586,604, filed on May 4, 2017, now Pat. No. 10,650,304.

(60) Provisional application No. 62/334,505, filed on May 11, 2016.

(51) Int. Cl.
| | |
|---|---|
| *G06N 3/043* | (2023.01) |
| *B60W 30/00* | (2006.01) |
| *G05D 1/00* | (2006.01) |
| *G06F 9/50* | (2006.01) |
| *G06N 7/02* | (2006.01) |

(52) U.S. Cl.
CPC .............. *G06N 3/043* (2023.01); *B60W 30/00* (2013.01); *G05D 1/0088* (2013.01); *G06F 9/5088* (2013.01); *G06N 7/02* (2013.01)

(58) Field of Classification Search
CPC ......... B60W 30/00; G06N 3/043; G06N 7/02; G05D 1/0088; G06F 9/5088
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 6,690,268 | B2 | 2/2004 | Schofield et al. |
| 6,693,517 | B2 | 2/2004 | McCarthy et al. |
| 7,580,795 | B2 | 8/2009 | McCarthy et al. |
| 8,316,605 | B2 | 11/2012 | Oberg |

(Continued)

FOREIGN PATENT DOCUMENTS

| | | |
|---|---|---|
| WO | 2008062512 A1 | 5/2008 |

*Primary Examiner* — Edwin A Young
(74) *Attorney, Agent, or Firm* — HONIGMAN LLP

(57) ABSTRACT

A vehicular driving assistance system includes an exterior viewing camera disposed at a vehicle and viewing exterior of the vehicle. Image data captured by the camera is provided to and processed at an electronic control unit (ECU). The ECU performs processing tasks for multiple vehicle systems. The vehicular driving assistance system is operable to wirelessly upload captured image data to the cloud for processing at a remote processor. Processing tasks with a higher priority are determined at the ECU to be higher priority tasks. Responsive to determination at the ECU of a higher priority task, the vehicular driving assistance system (i) processes captured image data at the ECU for the higher priority task and (ii) uploads captured image data to the cloud for processing at the remote processor of processing at the remote processor.

36 Claims, 3 Drawing Sheets

(56) References Cited

U.S. PATENT DOCUMENTS

| | | |
|---|---|---|
| 10,650,304 B2 | 5/2020 | Lu |
| 11,288,569 B2 | 3/2022 | Lu |
| 2006/0101465 A1 | 5/2006 | Kato et al. |
| 2010/0199283 A1 | 8/2010 | Kido et al. |
| 2011/0205042 A1 | 8/2011 | Takemura et al. |
| 2012/0062743 A1 | 3/2012 | Lynam et al. |
| 2012/0105637 A1 | 5/2012 | Yousefi et al. |
| 2012/0216208 A1 | 8/2012 | Takemura et al. |
| 2012/0218412 A1 | 8/2012 | Dellantoni et al. |
| 2013/0222592 A1 | 8/2013 | Gieseke |
| 2014/0031090 A1* | 1/2014 | Hart ................. H04W 52/0277 455/572 |
| 2014/0108188 A1* | 4/2014 | Comstock ............ G06F 3/1272 705/26.5 |
| 2014/0218529 A1 | 8/2014 | Mahmoud et al. |
| 2014/0222280 A1 | 8/2014 | Salomonsson et al. |
| 2014/0322676 A1 | 10/2014 | Raman |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0173858 A1 | 6/2016 | Beon et al. |
| 2016/0210853 A1 | 7/2016 | Koravadi |
| 2016/0351051 A1 | 12/2016 | Murthy et al. |
| 2017/0110022 A1 | 4/2017 | Gulash |
| 2017/0331637 A1 | 11/2017 | Lu et al. |
| 2018/0204111 A1* | 7/2018 | Zadeh .................. G06V 10/764 |

\* cited by examiner

VEHICULAR DRIVING ASSIST SYSTEM WITH ENHANCED DATA PROCESSING

CROSS REFERENCE TO RELATED APPLICATIONS

The present application is a continuation of U.S. patent application Ser. No. 15/929,569, filed May 11, 2020, now U.S. Pat. No. 11,288,569, which is a continuation of U.S. patent application Ser. No. 15/586,604, filed May 4, 2017, now U.S. Pat. No. 10,650,304, which claims the filing benefits of U.S. provisional application Ser. No. 62/334,505, filed May 11, 2016, which is hereby incorporated herein by reference in its entirety.

FIELD OF THE INVENTION

The present invention relates generally to a driver assistance system for a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Image data captured by the cameras (and other data) is processed, such as for object detection or other machine vision functions.

SUMMARY OF THE INVENTION

The present invention provides a driver or driving assistance system or vision system or imaging system for a vehicle that utilizes one or more cameras (preferably one or more CMOS cameras) to capture image data representative of images exterior of the vehicle, and provides processing of data in a manner that, responsive to a determination of a priority of various processing tasks required by one or more systems or modules or control units of the vehicle, processes a higher priority task and shifts processing of lower priority tasks to other processors or modules within the vehicle or to one or more remote processors, such as via the cloud. The system may compare real-time data and profiles from remote processors, and may utilize artificial intelligence engines for data analysis.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
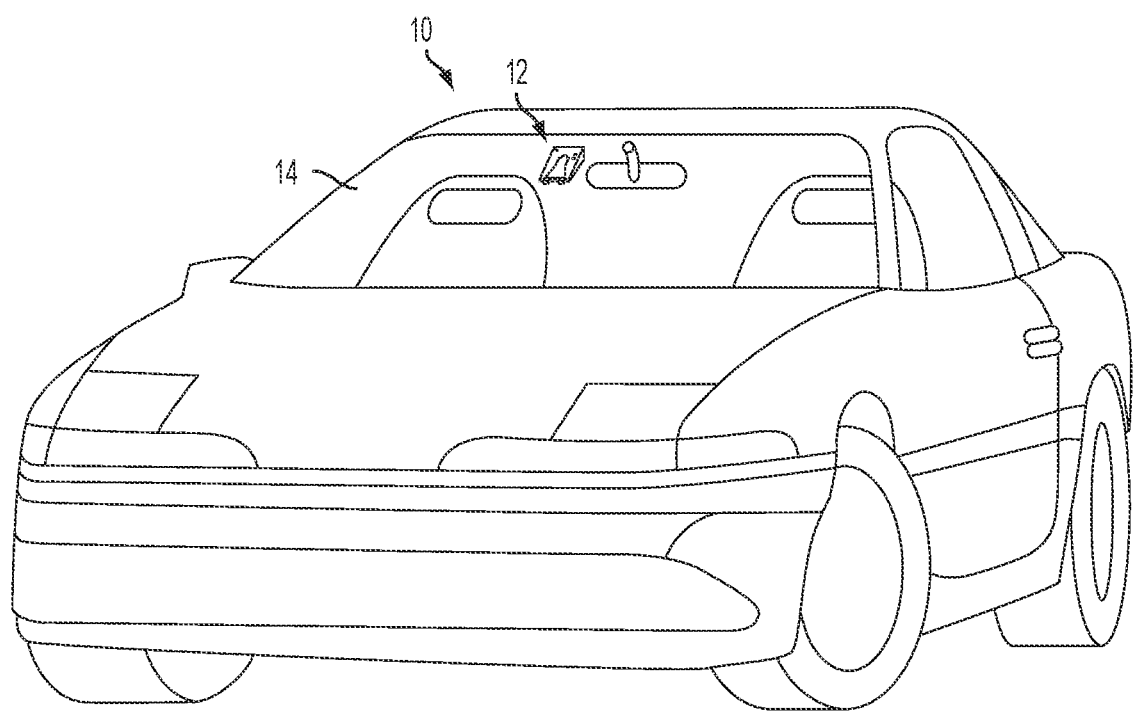
FIG. 1 is a plan view of a vehicle with a vision system that incorporates at least one camera or sensor in accordance with the present invention.

Referring now to the drawings and the illustrative embodiments depicted therein, a vehicle 10 includes an imaging system or vision system 12 that includes at least one exterior facing imaging sensor or camera, such as a forward viewing camera disposed at and behind a windshield 14 of the vehicle and viewing through the windshield and forward of the vehicle, such as for capturing image data for use with a driver assistance system of the vehicle, such as a headlamp control system, collision avoidance system, object detection system, traffic sign recognition system, lane departure warning system and/or the like (FIG. 1). Optionally the vision system may include other cameras, such as a rearward facing imaging sensor or camera at the rear of the vehicle, a forward facing camera at the front of the vehicle, and a sideward/rearward facing camera at respective sides of the vehicle, which capture images exterior of the vehicle. The vision system 10 includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

In the process of collecting and processing the substantial and growing amount of data for vehicle systems, such as driver assist systems and communication systems and the like, the demands on data bandwidth and processor speed will grow exponentially. The present invention provides a method to delay the bottle neck effect by redistributing the computation work load by:

1. For an individual vehicle:
   a. The system utilizes the under-used integrated circuits (ICs) for performance needed calculations;
   b. If a specific module calls for a specific action (such as a safety critical calculation), then the system shifts some of the lower priority tasks from that specific module to other modules within the equipped vehicle. That is, a processor may determine that one or more processors are underutilized and cause the processor(s) to process data pertaining to a determined lower priority task.
1. For platooning or system selected vehicles:
   a. Vehicle initiated—the system can process some data between the vehicles/infrastructure first, such as vehicle to vehicle (V2V) data or vehicle to infrastructure (V2X or V2I) data, then can upload data to the cloud for further processing.
   b. Cloud initiated—the cloud can also multicast commands to a group of vehicles for faster local data processing then demand results.

Figure 2:
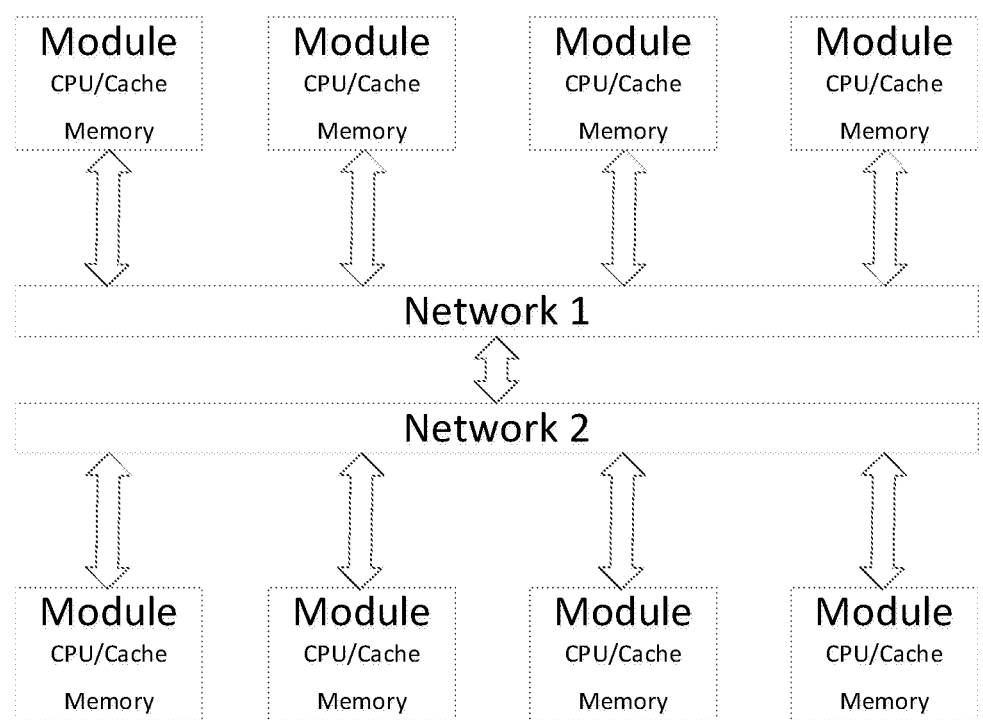
FIG. 2 is a schematic of an automotive processing system architecture for a system of the present invention.

Referring now to FIG. 2, each module of a vehicle (e.g., CPU, cache, and/or memory) is connected to a network (i.e., Network 1). Different networks may connect to other networks (e.g., Network 1 is connected with Network 2). The system and method of the present invention thus utilizes the cloud and fog and requires the cloud and fog to have a common platform in order to carry out the negotiation, data collection, load analysis, load distribution and monitoring in real-time. The potential benefits of the system and method of the present invention include extended life cycles for multiple components in the vehicle and increased performance similar to parallel processing.

Once the system has collected and processed the vehicle and driver data in the cloud/fog servers, the information will be referenced in real-time with module/driver behaviors, and in many situations, the module behavior is a reflection of human behavior.

Figure 3:
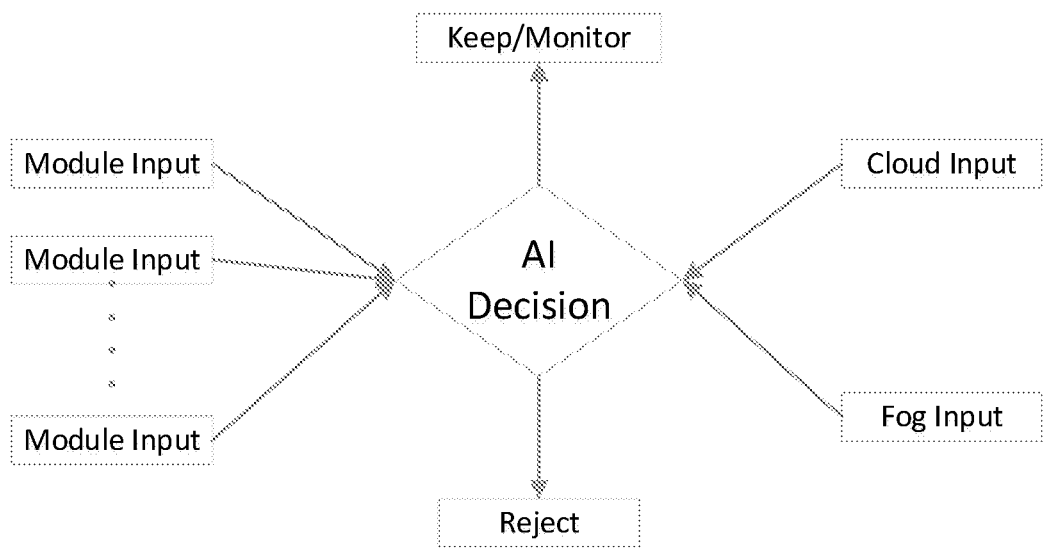
FIG. 3 is a schematic of a processing system of the present invention.

In such events, the real-time data monitoring (also collected) can be implemented with fuzzy-logic based algorithms to better mimic human behaviors. In comparing the real-time data and the profiles from servers, artificial intelligence engines can be used for analysis (FIG. 3). Multiple approaches can be processed in parallel during the learning and decision making processes, such as statistic based, fuzzy-logic based, neural network based and even artificial psychology based. The potential benefits include shorter processing timing and more precise decision making.

The system may communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2016-0210853; US-2014-0375476; US-2014-0218529; US-2013-0222592; US-2012-0218412; US-2012-0062743; US-2015-0251599; US-2015-0158499; US-2015-0124096; US-2015-0352953 and/or US-2016-0036917, which are hereby incorporated herein by reference in their entireties.

The system or systems of the present invention may utilize one or more cameras or sensors. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the camera may comprise a forward facing camera, such as disposed at a windshield electronics module (WEM) or the like. The forward facing camera may utilize aspects of the systems described in U.S. Pat. Nos. 8,256,821;

7,480,149; 6,824,281 and/or 6,690,268, and/or U.S. Publication Nos. US-2015-0327398; US-2015-015713; US-2014-0160284; US-2014-0226012 and/or US-2009-0295181, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assistance system, said vehicular driving assistance system comprising:
   an exterior viewing camera disposed at a vehicle equipped with said vehicular driving assistance system and viewing exterior of the vehicle;
   wherein said exterior viewing camera comprises an imager having at least one million photosensor elements;
   an electronic control unit (ECU) disposed at the vehicle;
   wherein image data captured by said exterior viewing camera is provided to and is processed at said ECU;
   wherein said ECU performs processing tasks for multiple vehicle systems;
   wherein said vehicular driving assistance system is operable to wirelessly upload captured image data to the cloud for processing at a remote processor;
   wherein processing tasks with a higher priority are determined at said ECU to be higher priority tasks; and
   wherein, responsive to determination at said ECU of a higher priority task, said vehicular driving assistance system (i) processes captured image data at the ECU for the higher priority task and (ii) uploads captured image data to the cloud for processing at the remote processor of processing at the remote processor.

2. The vehicular driving assistance system of claim 1, wherein processing of uploaded captured image data at the cloud comprises processing of uploaded captured image data at a fog server.

3. The vehicular driving assistance system of claim 2, wherein processing of uploaded captured image data comprises, in real-time, at least one selected from the group consisting of (i) data negotiation, (ii) data collection, (iii) load analysis, (iv) load distribution and (v) monitoring.

4. The vehicular driving assistance system of claim 2, wherein processing of uploaded captured image data at the fog server comprises processing at a decentralized infrastructure that places storage and processing components at the edge of the cloud.

5. The vehicular driving assistance system of claim 2, wherein the cloud and fog server have a common platform.

6. The vehicular driving assistance system of claim 1, wherein processing tasks with a lower priority are determined at said ECU to be lower priority tasks.

7. The vehicular driving assistance system of claim 6, wherein said ECU determines underutilized processors of the vehicle and causes at least one underutilized processor of the determined underutilized processors to process data pertaining to a determined lower priority task.

8. The vehicular driving assistance system of claim 1, wherein said vehicular driving assistance system receives and processes real-time data from the remote processor.

9. The vehicular driving assistance system of claim 8, wherein said vehicular driving assistance system utilizes artificial intelligence for data analysis in real-time.

10. The vehicular driving assistance system of claim 1, wherein said exterior viewing camera comprises a forward-viewing camera viewing at least forward of the vehicle, and wherein said ECU processes image data captured by said forward-viewing camera.

11. The vehicular driving assistance system of claim 10, wherein said ECU processes image data captured by said forward-viewing camera to detect an object present exterior of the vehicle in a path of travel of the vehicle.

12. The vehicular driving assistance system of claim 10, wherein said ECU processes image data captured by said forward-viewing camera for a collision avoidance system of the vehicle.

13. The vehicular driving assistance system of claim 10, wherein said ECU processes image data captured by said forward-viewing camera for a headlamp control system of the vehicle.

14. The vehicular driving assistance system of claim 10, wherein said ECU processes image data captured by said forward-viewing camera for a lane departure warning system of the vehicle.

15. The vehicular driving assistance system of claim 10, wherein said ECU processes image data captured by said forward-viewing camera for a traffic sign recognition system of the vehicle.

16. The vehicular driving assistance system of claim 10, wherein said ECU processes image data captured by said forward-viewing camera for (i) a collision avoidance system of the vehicle, (ii) a headlamp control system of the vehicle, (iii) a lane departure warning system of the vehicle and (iv) a traffic sign recognition system of the vehicle.

17. The vehicular driving assistance system of claim 1, wherein said exterior viewing camera comprises a rearward-viewing camera viewing at least rearward of the vehicle, and wherein said ECU processes received captured image data to detect an object rearward of the vehicle.

18. The vehicular driving assistance system of claim 1, wherein said ECU and other processors of the vehicle communicate with one another via a communication network of the vehicle.

19. A vehicular driving assistance system, said vehicular driving assistance system comprising:
- a forward-viewing camera disposed at a windshield of a vehicle equipped with said vehicular driving assistance system and viewing at least forward of the vehicle through the windshield;
- wherein said forward-viewing camera comprises an imager having at least one million photosensor elements;
- an electronic control unit (ECU) disposed at the vehicle;
- wherein image data captured by said forward-viewing camera is provided to and is processed at said ECU;
- wherein said ECU performs processing tasks for multiple vehicle systems, the vehicle systems including a collision avoidance system of the vehicle and at least one selected from the group consisting of (i) a headlamp control system of the vehicle, (ii) a traffic sign recognition system of the vehicle and (iii) a lane departure warning system of the vehicle;
- wherein said vehicular driving assistance system is operable to wirelessly upload captured image data to the cloud for processing at a remote processor;
- wherein said ECU processes image data captured by said forward-viewing camera to detect an object present exterior of the vehicle in a path of travel of the vehicle;
- wherein processing tasks with a higher priority are determined at said ECU to be higher priority tasks; and
- wherein, responsive to determination at said ECU of a higher priority task, said vehicular driving assistance system (i) processes captured image data at the ECU for the higher priority task and (ii) uploads captured image data to the cloud for processing at the remote processor of processing at the remote processor.

20. The vehicular driving assistance system of claim 19, wherein processing of uploaded captured image data at the cloud comprises processing of uploaded captured image data at a fog server.

21. The vehicular driving assistance system of claim 20, wherein processing of uploaded captured image data comprises, in real-time, at least one selected from the group consisting of (i) data negotiation, (ii) data collection, (iii) load analysis, (iv) load distribution and (v) monitoring.

22. The vehicular driving assistance system of claim 20, wherein processing of uploaded captured image data at the fog server comprises processing at a decentralized infrastructure that places storage and processing components at the edge of the cloud.

23. The vehicular driving assistance system of claim 20, wherein the cloud and fog server have a common platform.

24. The vehicular driving assistance system of claim 19, wherein processing tasks with a lower priority are determined at said ECU to be lower priority tasks.

25. The vehicular driving assistance system of claim 24, wherein said ECU determines underutilized processors of the vehicle and causes at least one underutilized processor of the determined underutilized processors to process data pertaining to a determined lower priority task.

26. The vehicular driving assistance system of claim 25, wherein said vehicular driving assistance system receives and processes real-time data from the remote processor.

27. The vehicular driving assistance system of claim 25, wherein said ECU processes image data captured by said forward-viewing camera for a headlamp control system of the vehicle.

28. The vehicular driving assistance system of claim 19, wherein said vehicular driving assistance system utilizes artificial intelligence for data analysis in real-time.

29. The vehicular driving assistance system of claim 19, wherein said ECU processes image data captured by said forward-viewing camera for a lane departure warning system of the vehicle and for a traffic sign recognition system of the vehicle.

30. The vehicular driving assistance system of claim 19, wherein said ECU processes image data captured by said forward-viewing camera for (i) a headlamp control system of the vehicle, (ii) a lane departure warning system of the vehicle and (iii) a traffic sign recognition system of the vehicle.

31. A vehicular driving assistance system, said vehicular driving assistance system comprising:
- a forward-viewing camera disposed at a windshield of a vehicle equipped with said vehicular driving assistance system and viewing at least forward of the vehicle through the windshield;
- wherein said forward-viewing camera comprises an imager having at least one million photosensor elements;
- an electronic control unit (ECU) disposed at the vehicle;
- wherein image data captured by said forward-viewing camera is provided to and is processed at said ECU;
- wherein said ECU processes image data captured by said forward-viewing camera for (i) a headlamp control system of the vehicle, (ii) a lane departure warning system of the vehicle and (iii) a traffic sign recognition system of the vehicle;
- wherein said vehicular driving assistance system is operable to wirelessly upload captured image data to the cloud for processing at a remote processor;
- wherein processing tasks with a higher priority are determined at said ECU to be higher priority tasks; and
- wherein, responsive to determination at said ECU of a higher priority task, said vehicular driving assistance system (i) processes captured image data at the ECU for the higher priority task and (ii) uploads captured image data to the cloud for processing at the remote processor of processing at the remote processor.

32. The vehicular driving assistance system of claim 31, wherein processing tasks with a lower priority are determined at said ECU to be lower priority tasks.

33. The vehicular driving assistance system of claim 32, wherein said ECU determines underutilized processors of the vehicle and causes at least one underutilized processor of the determined underutilized processors to process data pertaining to a determined lower priority task.

34. The vehicular driving assistance system of claim 31, wherein said vehicular driving assistance system receives and processes real-time data from the remote processor.

35. The vehicular driving assistance system of claim 31, wherein said vehicular driving assistance system utilizes artificial intelligence for data analysis in real-time.

36. The vehicular driving assistance system of claim 35, wherein processing of uploaded captured image data at the cloud comprises processing of uploaded captured image data at a fog server.

\* \* \* \* \*